United States Patent [19]
Heh

[11] Patent Number: 5,311,417
[45] Date of Patent: May 10, 1994

[54] ILLUMINATIVE SUCKER & DECORATIVE STRING THEREOF

[76] Inventor: Mao-Lin Heh, c/o Hung Hsing Patent Service Center, P.O. Box 55-1670, Taipei (104), Taiwan

[21] Appl. No.: 109,910

[22] Filed: Aug. 23, 1993

[51] Int. Cl.⁵ ............................................. F21V 21/08
[52] U.S. Cl. ................................... 362/397; 362/250; 362/800; 362/806; D26/60
[58] Field of Search ............... 362/250, 397, 800, 806; D26/60

[56] References Cited
U.S. PATENT DOCUMENTS

| | | | |
|---|---|---|---|
| 2,052,425 | 8/1936 | Simeone | 362/397 |
| 2,675,534 | 4/1954 | Bryant | 362/397 |
| 2,806,314 | 9/1957 | Moran | 362/397 |
| 2,848,601 | 8/1958 | Walzer | 362/397 |
| 5,016,145 | 5/1991 | Singleton | 362/397 |

Primary Examiner—Richard R. Cole

[57] ABSTRACT

An illuminative sucker includes a decorative back portion formed on a back portion of a sucker cup portion adhered on a flat surface, a lamp selected from a light-emitting diode and an incandescent bulb fixed on a lamp socket secured to the back portion of the sucker cup portion for illuminating the decorative back portion for decorative display or warning purposes. A plurality of the illuminative suckers may be assembled to be a string adhered on a flat surface for wide-area decorative, display or warning purposes.

7 Claims, 6 Drawing Sheets

ILLUMINATIVE SUCKER & DECORATIVE STRING THEREOF

BACKGROUND OF THE INVENTION

A conventional Christmas-light string includes a plurality of Christmas lights or bulbs connected to a power source by a lengthy electrical cord which can be hung on a Christmas tree or any structure. However, it can not be adhered on a slippery surface such as a window glass to thereby limit its decorative uses and applications.

If it is intended to decorate a glass window with such a light (lamp) string, an additional stand, frame or even a display device should be further provided adjacent to the window for hanging the string of decorative lights (lamps), causing a very inconvenient installation and cost consuming job therefore.

SUMMARY OF THE INVENTION

The object of the present invention is to provide an illuminative sucker including a decorative back portion formed on a back portion of a sucker cup portion adhered on a flat surface, a lamp selected from a light-emitting diode and an incandescent bulb fixed on a lamp socket secured to the back portion of the sucker cup portion for illuminating the decorative back portion for decorative display or warning purposes.

Another object of the present invention is to provide a string consisting of a plurality of the illuminative suckers to be adhered on a flat surface for wide-area decorative, display or warning purposes.

DETAILED DESCRIPTION

Figure 1:
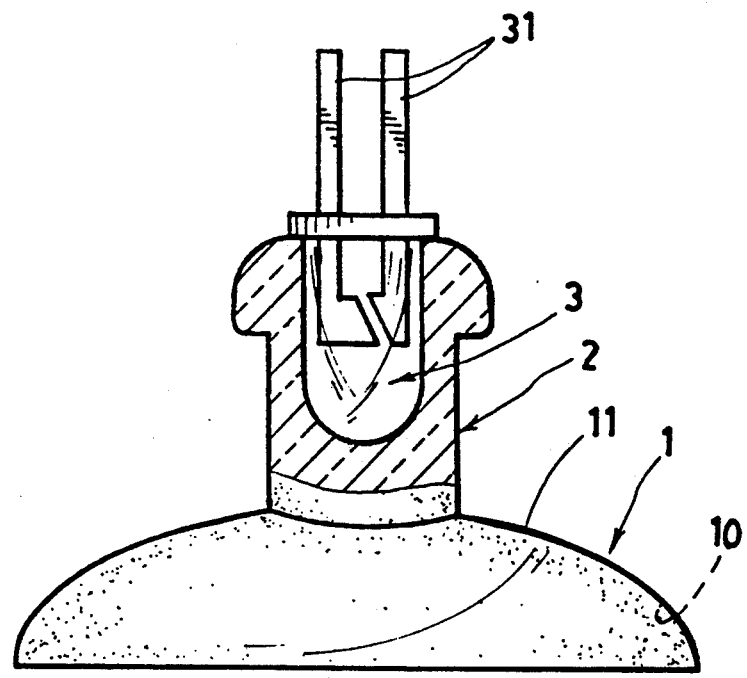
FIG. 1 is a sectional drawing of the present invention.
Figure 2:
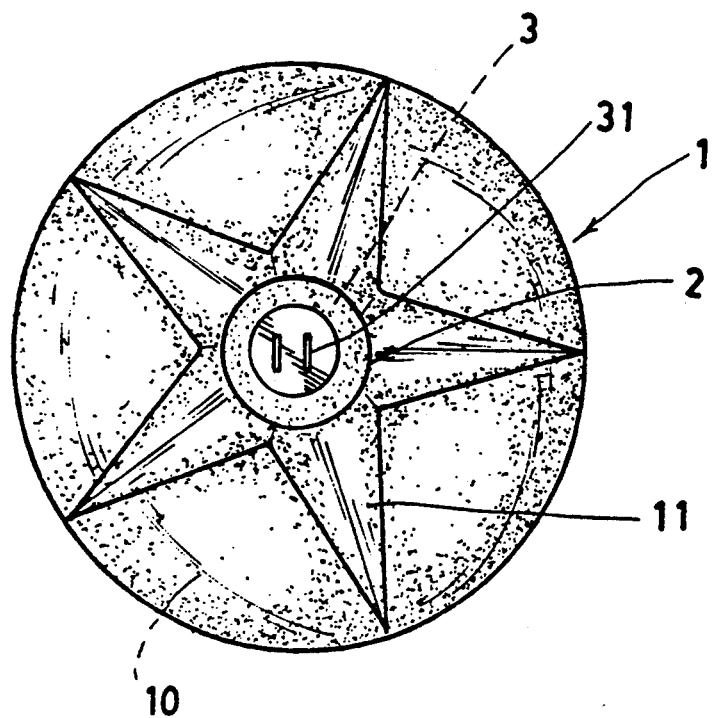
FIG. 2 is a back-side view of the illuminative sucker of the present invention.

As shown in FIGS. 1, 2, the present invention comprises: a sucker 1 having a sucker cup portion 10 having a cavity concavely recessed in the cup portion 10 to be adhered on a flat surface such as a glass window surface by vacuum when snapped on the flat surface and a decorative back portion 11 formed on a back portion of the sucker cup portion 10, a lamp socket 2 secured to the back portion 11 of the sucker 1, and a lamp 3 inserted in the lamp socket 2 and electrically connected to a power source for illuminating the lamp 3. The lamp socket 2 and the sucker 1 may be made of translucent or transparent materials.

The lamp 3 may be a light-emitting diode having a pair of leads 31 protruding outwardly for connecting a power source. The decorative back portion 11 may be formed with diversified three-dimensional decorative features or figures thereon. For forming an even illuminative surface, the back portion 11 may also be formed with a sand-like surface.

Figure 3:
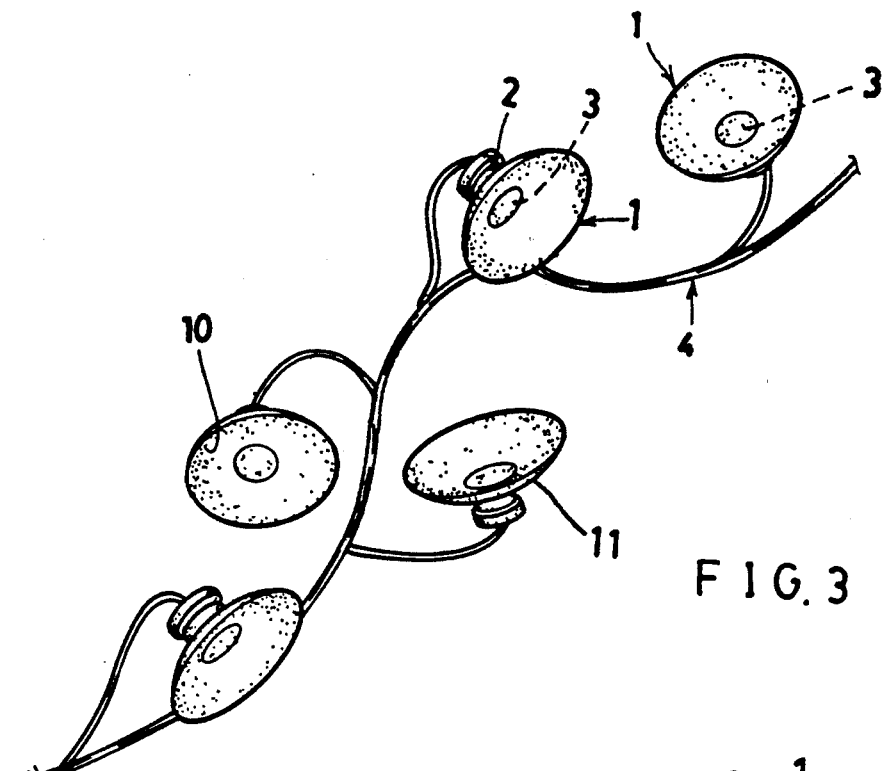
FIG. 3 is an illustration showing a string of the illuminative suckers in accordance with the present invention.
Figure 4:
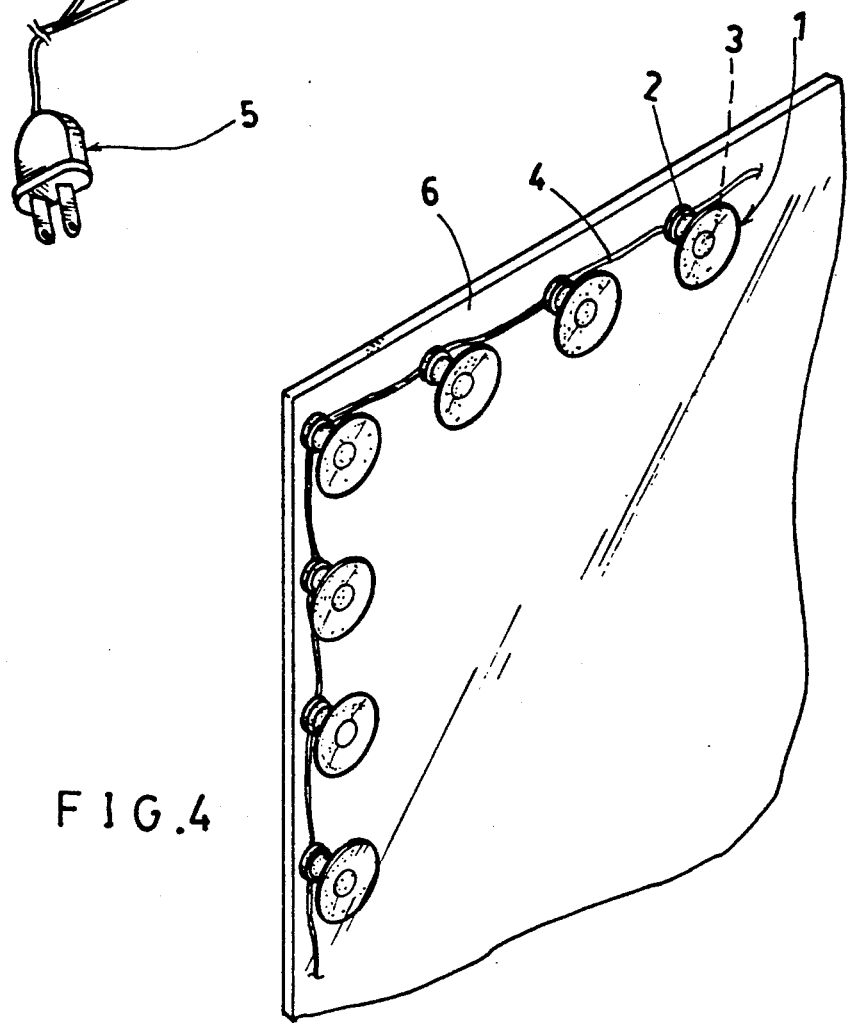
FIG. 4 shows another application of the present invention when made as a decorative string.

As shown in FIGS. 3, 4, a plurality of the suckers 1 may be electrically connected to a power source 5 by an electrical cord 4 to be sucked and adhered on a flat surface (FIG. 4). For instance, once the lamps 3 are lit as connected to the power source, the suckers 1 having the lamps 3 inserted thereon will reveal a brilliant optical decorative effect since each lamp 2 will project light beams towards the decorative back portion 11 formed on each socker 1 for forming glow on the back portion 11 of each sucker 1.

Figure 5:
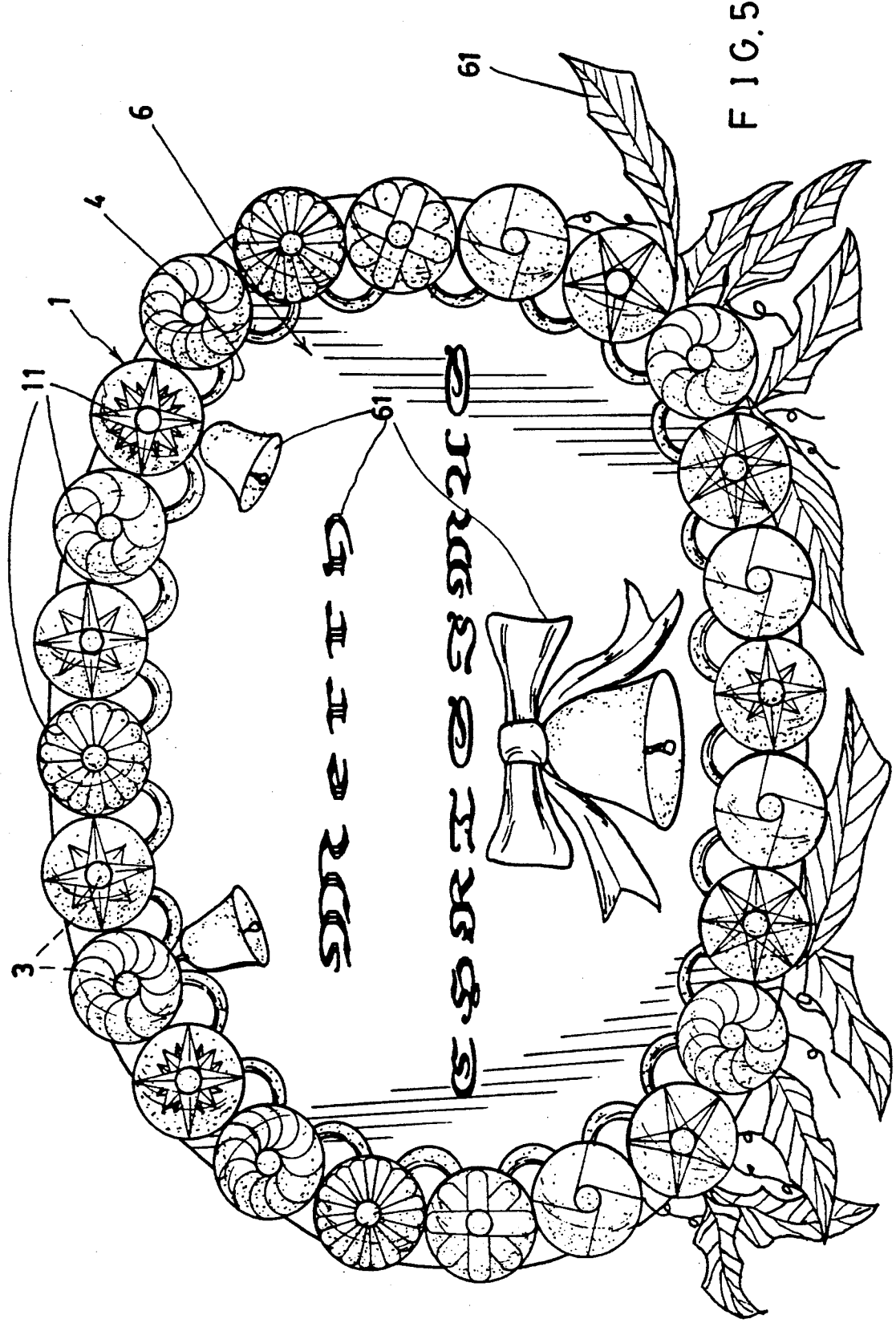
FIG. 5 shows still another application of the present invention serving as a Christmas-light string.

By shaping or arranging the string of the suckers 1 of the present invention as shown in FIG. 5, a Christmas decorative "flower string" may be formed on a display object 6 by adding several decorative accessories 61 to the suckers 1 connected with the electrical cord 4 to enrich the decorative effect of the present invention.

Figure 6:
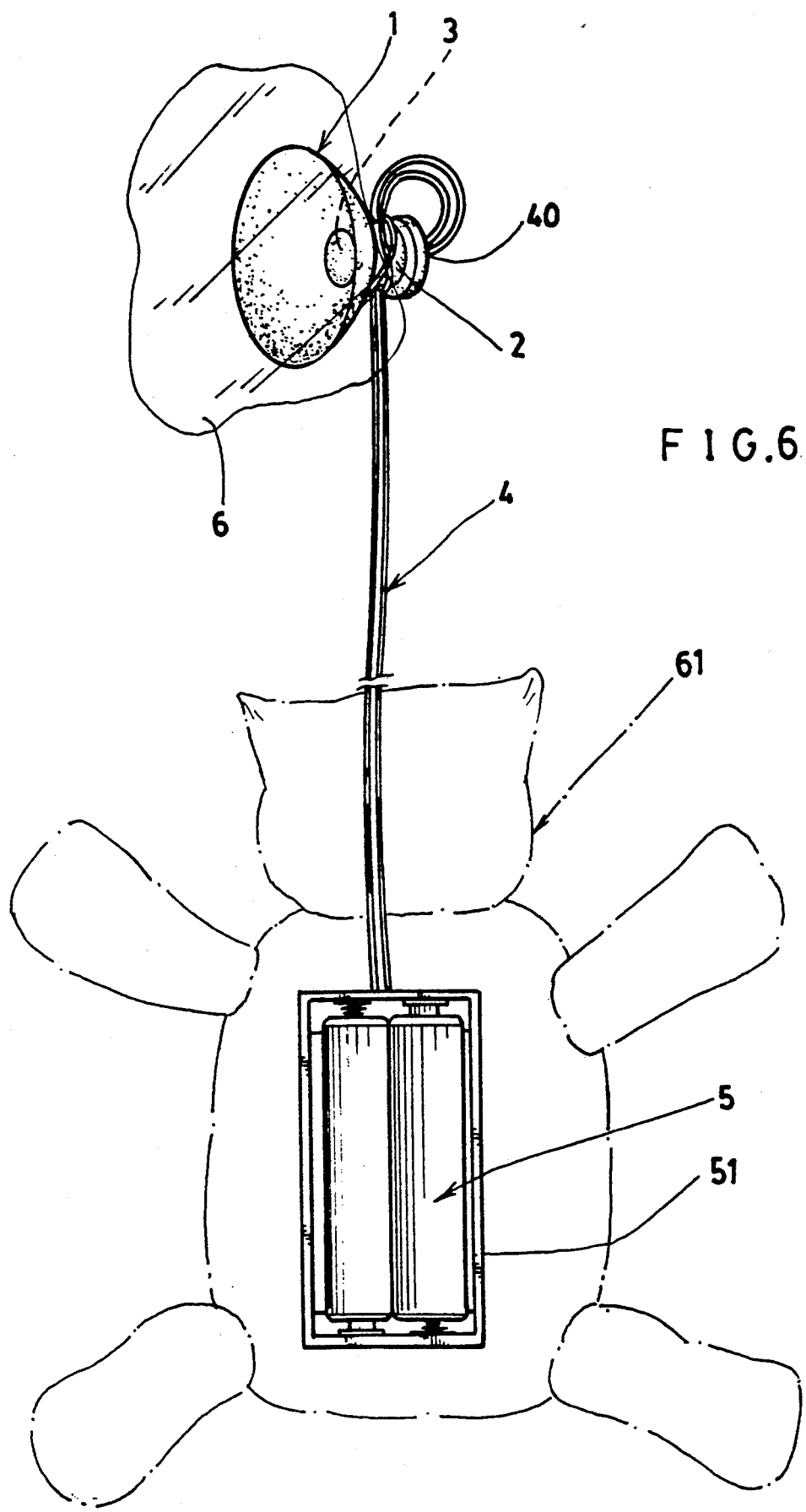
FIG. 6 shows an application of the present invention having a decorative doll pendent under the sucker.

If the sucker 1 is sucked and adhered to a glass window surface (adhering object) 6 as shown in FIG. 6, a doll or animal toy of decorative accessory 61 may be pendent under the sucker 1 by connecting an electrical cord 4 between the lamp 3 inserted in the socket 2 on the sucker 1 and a power source 5 which is selected from at least a battery stored in a battery box 51 formed in the decorative accessory (the doll) 61. For sealing a connection part between the cord 4 and the lamp 3 in the socket 2, a sealant 40 such as made of silicon rubber may be used for sealing any aperture existing in such a connection part.

Figure 7:
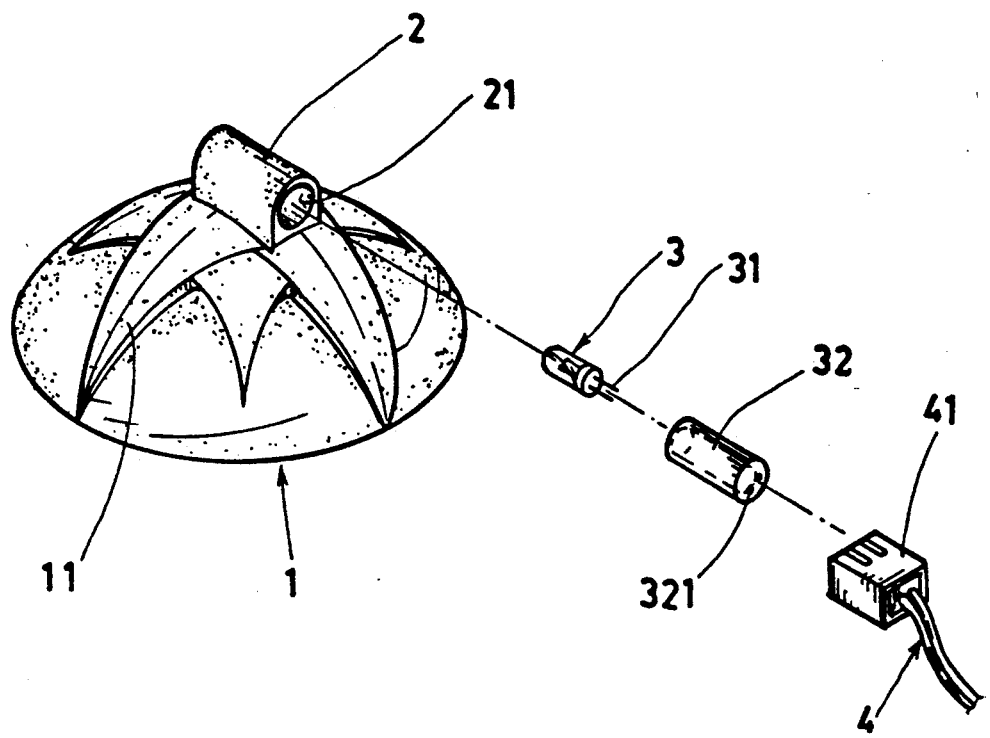
FIG. 7 shows another preferred embodiment of the present invention.
Figure 8:
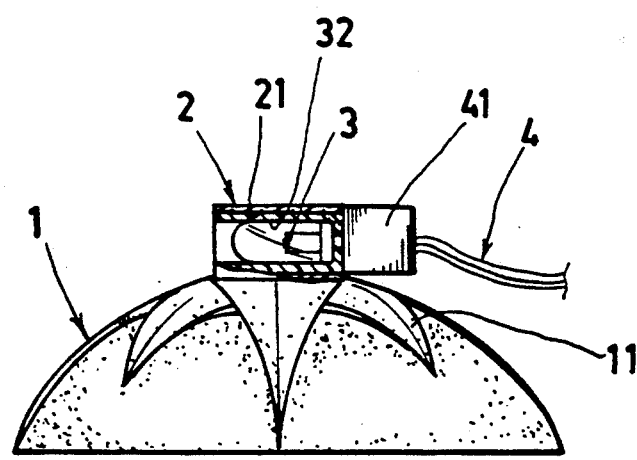
FIG. 8 is a partial sectional drawing of the sucker as shown in FIG. 7.

As shown in FIGS. 7 and 8, the sucker 1 of the present invention includes the lamp socket 2 formed with a socket portion 21 therein for inserting an incandescent bulb 3 into the socket portion 21 as packed by a sleeve 32 sandwiched in between the bulb 3 and the socket portion 21, and the bulb 3 having a pair of leads 31 protruding outwardly through lead holes 321 formed through the sleeve 32 to be connected to an adapter 41 of the electrical cord 4 connectable to the power source 5.

Figure 10:
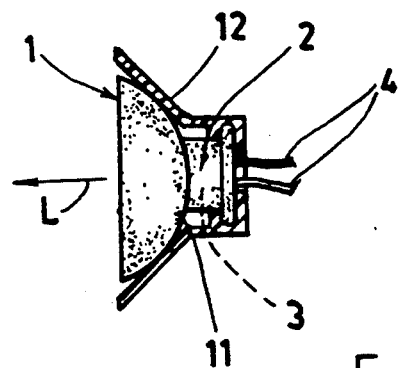
FIG. 10 is a partial sectional drawing of the sucker as used in FIG. 9.
Figure 9:
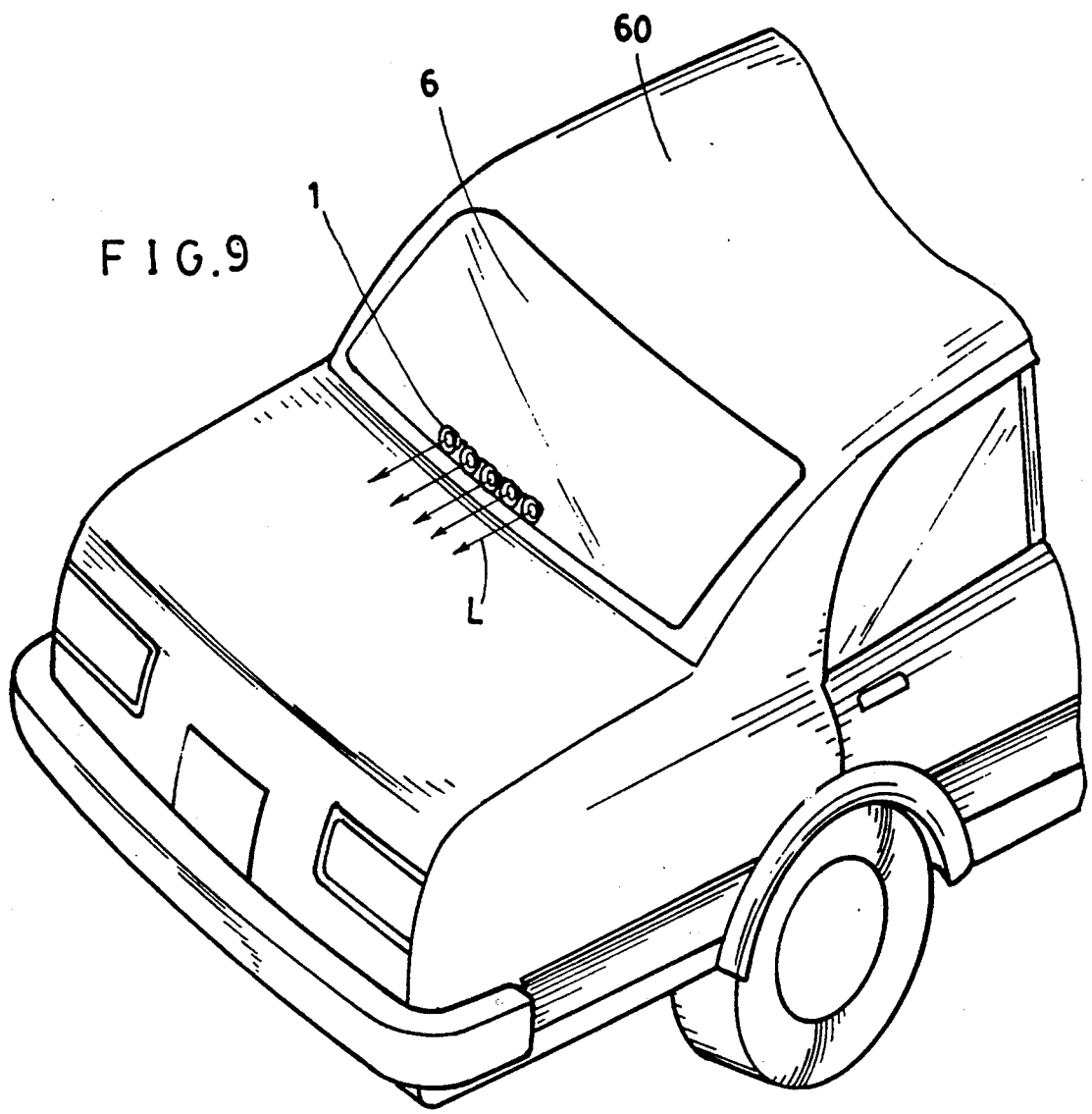
FIG. 9 shows further application of the present invention on a car.

As shown in FIGS. 9, 10, the present invention may be modified to add a shade 12 to shield a back portion 11 of the sucker 1 and shield the lamp socket 2 to allow the light beams L projecting rearwardly through a rear window 6 of a car 60, to which plural suckers 1 are juxtapositionally disposed and adhered thereon 1 for traffic warning purpose.

The present invention provides a unique illuminative sucker 1 or a string of plural illuminative suckers 1 which can be sucked to a flat surface of any adhering object 6 without any lighting fixture, structure, frame or display stand for a convenient decorating installation, also enhancing the optical decorative effect thereof.

The decorative features on the back portion of the sucker and the lamps 3 are not limited in this invention, which can be optionally chosen, designed and modified to be suitable for the applied decorative situations.

I claim:

1. An illuminative sucker means comprising:
    a sucker made of transparent or translucent materials having a sucker cup portion to be sucked to a flat surface by vacuum and a decorative back portion formed on a back portion of the cup portion;

a lamp socket made of transparent or translucent materials secured to the back portion of said sucker; and a lamp inserted in the lamp socket and electrically connected to a power source, whereby upon a powering of said lamp, said lamp will illuminate to project lights towards the decorative back portion and the sucker cup portion of said sucker for illuminative decorative purpose.

2. An illuminative sucker means according to claim 1, wherein said lamp on said sucker is selected from a light-emitting diode and an incandescent bulb, having a pair of leads protruding outwardly from the lamp to be connected to a power source.

3. An illuminative sucker means according to claim 1, wherein said sucker has said lamp electrically connected to a power source by an electrical cord.

4. An illuminative sucker means according to claim 3, wherein said power source includes at least a battery stored in a battery box fixed in a decorative accessory, said electrical cord connecting said battery box and said decorative accessory to said lamp and said sucker for pendently hanging said decorative accessory on an adhering object by adhering said sucker to said adhering object by vacuum suction.

5. An illuminative sucker means according to claim 1, including a plurality of said suckers, each said sucker connected to an electrical cord which is connected to said power source for powering a plurality of said lamps inserted in said suckers for forming a string of said suckers for illuminative decorative purpose.

6. An illuminative sucker means according to claim 2, wherein said lamp of incandescent bulb includes said pair of leads connected to an adapter of an electrical cord connected to the power source, and a sleeve packed between said lamp and a socket portion of a lamp socket secured to a back portion of said sucker for firmly inserting said lamp of said bulb in said lamp socket of said sucker.

7. An illuminative sucker means according to claim 1, wherein said sucker includes a shade shielding said back portion of said sucker and shielding said lamp socket to allow a light of said lamp to project rearwardly from said cup portion towards an observer on a rear side of said cup portion of said sucker for illuminative warning purpose.

* * * * *